June 30, 1964  W. H. DANE  3,139,060
MOBILE SPRAYING UNITS
Filed Dec. 6, 1962
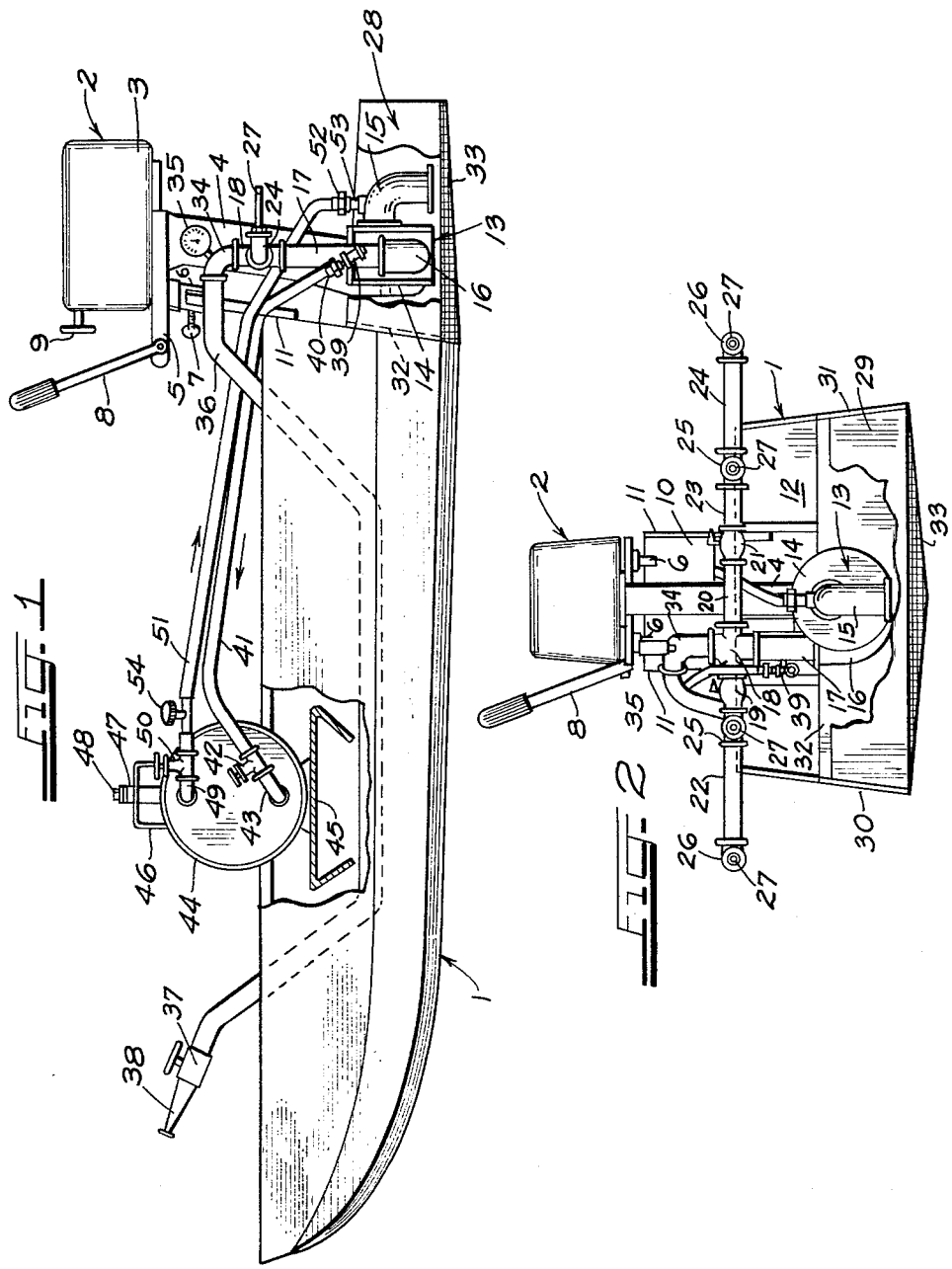
INVENTOR.
WILLIS H. DANE
BY

United States Patent Office 3,139,060
Patented June 30, 1964

3,139,060
MOBILE SPRAYING UNITS
Willis H. Dane, Oglesby, Ill., assignor to Carus Chemical Company, Inc., La Salle, Ill., a corporation of Illinois
Filed Dec. 6, 1962, Ser. No. 242,675
6 Claims. (Cl. 115—12)

This invention, in general, relates to the spraying of a body of water and has more particular reference to the spraying of a chemical or chemicals on a body of water from a floating unit.

Aquatic weeds and flora of all types have caused grave economic problems in water distribution and drainage systems. This is particularly true in the irrigated portions of the western states where aquatic weeds interfere either directly or indirectly with the rapid and efficient delivery of irrigation water to dry areas. These weed pests increase loss from seepage and evaporation, engender the rapid collection of silt, tend to bring about canal breaks and in other ways constitute a most serious regional problem. In canals, rivers and streams they interfere with navigation, and in ponds and lakes weeds and algae tend to materially limit the usefulness of such bodies of water for either recreational or commercial purposes.

There are many natural bodies of water which are treated periodically with chemicals such as algaecides or aquatic weed killers. Algae, aquatic weeds and the like are often difficultly accessible from the shore of a lake, pond or the like. This invention pertains to floating units such as a boat, a pontoon raft, or the like in which the body of water is sprayed from the floating unit. The spray system of the floating unit includes a power-driven pump having its inlet submerged in a body of water. The outlet of the pump connected with a spray means mounted on the stern of the floating unit, which spray means is preferably a horizontal manifold on which is mounted a series of spray pipes or nozzles directed rearwardly. The pump is of a size and capacity sufficient to eject through the spray nozzles or pipes water streams having sufficient velocity to impart a progressive force to move the floating unit forwardly. In a preferred practice of the invention, the manifold is mounted to pivot about the vertical axis so that it can be turned and thereby also used to steer the floating unit.

The chemical or chemicals to be used for the chemical treatment of the water, or algae, or aquatic weeds or the like may be injected into the pump water and discharged with the spray streams from the spray pipes or nozzles. When employing water-soluble or water-dispersible chemicals, the pumping system preferably includes a solution pot instead of a tank of solution. The solution pot is filled with dry or concentrated chemical. The outlet of the pump is tapped and connected by suitable pipe, tube or hose connections to the solution pot. A portion of the pump discharge stream flows to the solution pot, in which pot the treating chemical is dissolved or dispersed. The chemical is then withdrawn from the solution pot and fed into the pumping system, e.g., by connecting the outlet of the solution pot by suitable piping, tubing or hose with the suction inlet of the pump.

One of the special features of the invention is the ready adaptation of the invention on boats or other floating units propelled by an outboard motor. The propeller of the outboard motor is replaced by the pump and the pump is driven from the drive of the outboard motor. The pump, itself, or at least the outer end of the pump inlet is submerged in the water at the stern of the boat. The manifold is mounted on the pump outlet so that turning the outboard motor in the usual manner turns the manifold about a vertical axis to provide the aforesaid steering function.

The use of the spraying jets for propulsion in steering, as well as for spraying, eliminates many difficulties and dangers connected with the propeller propulsion of a spraying rig. As a result, very shallow water can be entered by the floating spraying rig and can be sprayed easily and safely. The operability in shallow water allows the floating unit to enter areas where algae concentration is the heaviest without stopping the pump.

The over-all floating rigs or units of the invention may be very small and light and are easily transported, assembled and operated. The use of a solution pot considerably reduces load weight as compared with the load weight in which a tank of solution or dispersion is utilized. Maneuverability of the units or rigs, combined with their small size and shallow draft, permits operation around and among obstructions, such as sunken logs, tree stumps, etc., as well as operation in shallow water. Each of the components of the spraying units or rigs is small enough to be easily handled by one man during assembly and disassembly. Furthermore, the handling of toxic, staining, or corrosive chemicals is made easier by the rigs or units of the invention.

It is a primary object of this invention to provide mobile units for the spraying of natural bodies of water.

A further important object of the invention is to provide easily maneuverable floating units for the spraying of chemicals on bodies of water.

A further object of the invention is to provide floating, mobile spray units which can be propelled and/or steered by the spray jets.

A further object of the invention is to provide floating, mobile spraying units operable in shallow water.

Another object of the invention is to provide adaptations of an outboard motor-boat combination for the spraying of a body of water and also for providing propulsive force to move the boat.

Still another object of the invention is to provide a pump driven by an outboard motor for a boat wherein the power output of the outboard motor is used to drive the pump to provide a stream of water to be sprayed on a natural body of water.

Another object is to provide a novel combination of a pump and spray means for propelling and/or steering a boat, pontoon raft or like floating unit.

It is a still further object of the invention to provide spray means providing spray jet streams capable of good penetration of the spray chemical into the sub-surface regions of waters of the pond, lake, stream, etc., being sprayed; and a related object is to provide spray pipes which are pivotable about a horizontal axis to regulate the angle of the spray jet streams relative to the surface of the water and thus control or regulate the degree of penetration of the jet streams into the sub-surface regions of the water.

The foregoing and numerous other important objects and advantages and inherent functions of the invention will become apparent as the same is more fully understood from the following description, which, taken in connection with the drawings, discloses a preferred embodiment of the invention.

Referring to the drawings:

FIG. 1 is a side elevation of a boat with a spray-propulsion system of the invention mounted thereon with portions broken away to facilitate illustration of the invention; and FIG. 2 is a rear elevation of the embodiment of FIG. 1 with a portion broken away to facilitate illustration of the invention.

Referring to the drawings, the illustrated embodiment comprises a boat 1 having a conventional outboard motor 2 mounted on the stern. The outboard motor 2 comprises an internal combustion engine housing 3, and a drive shaft housing 4 extending downwardly therefrom which may include a cooling system for cycling water to the internal combustion engine. The frame 5 of the outboard motor is mounted by U-bracket 6 at the rear of the boat by the use of screw clamps 7. The motor has a pivotable steering handle 8 and a handle 9 for a starting cord or cable.

When using a conventional outboard motor in a form adapted to the invention, the motor is held in the higher elevation on the transom of the boat than is the case where the outboard motor is used in conjunction with a propeller drive. Accordingly, the motor mount brackets 6 are clamped by screw clamps 7 on a motor mount plate 10 supported by L-channels 11 mounted on the transom 12 of the boat. With outboard motors designed for purposes of the invention with a shorter drive shaft and drive shaft housing 4, the motor mount plate 10 may be omitted and the motor mount 6 may be placed over the upper edge of the transom of the boat.

The lower end of the drive shaft housing 4 carries a centrifugal pump 13, the drive shaft of which is connected to the drive shaft for the propeller of the outboard engine. The centrifugal pump 13 replaces the propeller of an ordinary outboard motor.

The centrifugal pump 13 comprises a pump housing 14, an intake pipe 15 and an outlet pipe 16. Centrifugal pumps of this character are well known in the art.

The outlet 16 of the pump 13 is coupled by a pipe 17 to a cross or X-coupling 18. The coupling 18 supports sidewardly directed tubes or pipes comprising a manifold for distributing pumped water to spray nozzles or spray pipes located along the manifold. In the illustrated case, the manifold comprises a manually operated valve 19 mounted on one side of the cross coupling 18. A pipe 20 is mounted on the other side of the cross coupling. Pipe 20 is joined with a manually operated valve 21 of similar character to valve 19. The remainder of the manifold comprises the pipes 22, 23 and 24, T-couplings 25 and elbows 26. A rearwardly directed spray pipe 27 is mounted in each of the elbows 26 and the T-couplings 25.

In operation, the intake pipe 15 has its lower end submerged below the level of the body of water in which the boat 1 is floating. The water is drawn through the pipe 15 into the centrifugal pump and is pumped from the outlet 16 through pipe 17 into the cross coupling 18. When the valves 19 and 21 are opened, this water flows through the pipes 20, 22, 23 and 24 and is ultimately discharged through the spray pipes 27 in the form of jet streams of water. The streams spray outwardly to the rear of the boat and provide a propulsive force sufficient to move the boat forward through the water at high speed operation of the pump 13.

It is desirable to prevent algae and other foreign matter from being sucked into the pump 13 to avoid clogging of the water distribution system of the spray system and also to prevent aggregation of algae and other foreign matter in the solution pot, hereafter described. Therefore, there is provided on the lower portion of the stern of the boat 1 rearwardly directed screen structure 28 comprising a rear wall 29, side walls 30, 31, and a front wall 32 attached to the stern of the boat. The top edges of the walls 29, 30 and 31 should be sufficiently high to prevent water from overflowing into the screen structure 28. The bottom of the screen structure is covered with a screen 29 which will prevent algae and other foreign substances from entering the screen structure 28. Thus, the screen structure 28 provides a casing or housing around the pump inlet 15 to provide a body of water free from algae and other foreign substances.

The upper leg of the cross coupling 18 has an elbow 34 mounted therein. A pressure gauge 35 may be provided in this elbow for measuring the pressure in the pumping system. This gauge may be also mounted at other points in the pumping system, or omitted, if desired.

The elbow 34 is connected to a high pressure hose 36, e.g., a fire hose. A hose 36 has at its terminal end a manually-operated valve 37 and a spray nozzle 38. The hose 36 is an adjunct to the primary spraying system of the invention. It is used in cases where spraying is to be done from the boat in areas which cannot be reached by the sprays of the spray pipes 27. The sprayer, in this instance, closes the valves 19, 21 and opens the valve 37 of the hose 36. He can then direct the spray of the hose 38 to the inaccessible areas of the lake, pond, canal or the like.

The treating chemical to be incorporated into the sprays of the spray pipe 27 or the spray of the hose 38 may be injected into the system in many ways. A convenient and advantageous chemical injection system is one employing the use of the aforesaid solution pot. In this case, the chemical in dry form or in concentrated form is dissolved in a circulating stream of water. This circulating stream may be provided by tapping the outlet side of the pump 13 with a small take-off such as the T-coupling 39 tapped into the wall of the coupling pipe 17 on the outlet of the pump. The T-coupling 39 is connected by a union 40 with a hose 41. The hose 41 is connected to a manually-operable valve 42 mounted on an elbow 43 in the side of and opening into the solution pot 44. The solution pot 44 in the illustrated case, is a cylindrical tank seated or resting on a seat 45 in the boat 1. The tank 44 may have a pair of U-shaped handles 46 by which it may be lifted into and out of the boat 1. It has a fill tube 47 with a cap 48 thereon.

The water flowing through the hose 41 enters the tank 44 near the bottom thereof. It flows through the tank 44 in contact with the solid chemical. The chemical is dissolved in the water and the chemical solution is discharged from the tank 44 through an elbow 49 provided in the upper portion of the tank. The elbow 49 carries a manually-operated valve 50, which, in turn, is connected with a hose 51. The end of the hose 51 is joined by a union 52 to a tapped pipe 53 mounted on and communicating with the inlet 15 of the pump. The chemical solution is drawn into the pump inlet, pumped through the pump and then sprayed out the spray system heretofore described. If desired, the outlet line from the tank 44 may have therein a pressure gauge 54 for observing the pressure in the solution pot cycling system.

One of the areas of practical use for the mobile spray units of the invention is in the spraying of ponds, lakes, canals and the like, with potassium permanganate solution. Potassium permanganate is marketed in the form of crystals which are readily water-soluble. It is an excellent chemical for the treatment of algae. Because of its solid-water-soluble character, potassium permanganate is especially adapted for use in systems employing a solution pot of the aforesaid character. By varying the flow rate through the tank 44 by opening or closing the valves 42 and/or 50, the concentration of potassium permanganate in the discharged spray can be readily controlled. Accordingly, the mobile spray units of the invention allow the application of relatively concentrated potassium permanganate solutions in areas of heavy algae growth as well as the application of less concentrated solutions in areas of algae growth requiring smaller dosage applications. The solution pot systems may also be used for applying other solid, crystalline or granular, water-soluble or water-dispersible algicides or aquatic weed killers. With minor modifications, the spray systems can also be adapted for the spraying of water-miscible or water-dispersible chemicals, e.g., emulsifiable organic solutions which are metered into the spray system.

The method of spraying with jets, as done with this system, provides not only for propulsion but also forces the permanganate or other algicide or weed killer to penetrate into the water for some distance, and the resulting agitation causes a good distribution. This system, then, is in contrast to the typical spraying system which provides very little penetration for the sprayed chemical.

The spray pipes 27 are pivotable about a horizontal axis. They may be directed horizontally rearwardly (as shown), or they may be directed rearwardly upwardly or rearwardly downwardly for, respectively, lesser or deeper penetration of the spray jet streams into the water being sprayed. The threaded connections of pipes 20, 22, 23, 24 and valve 19 to couplings 25, 26 allow for positioning of the spray pipes 27 at the desired angle relative to the water's surface for a particular situation. Other couplings providing this pivoting function for the spray pipes may be used, if desired.

In addition to tapping the pump discharge to circulate water through the solution pot, the pump discharge may also be tapped to circulate water to the water cooling system of the internal combustion engine in motor housing 3. A strainer in the tap is employed to advantage to prevent small particles that may come through the screen 33 from plugging the engine cooling system or from being deposited in the solution pot.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A mobile unit for the chemical treatment of a body of water comprising a boat, an outboard motor mounted on the stern of said boat, said outboard motor including a frame mounted for pivotal movement about a vertical axis of rotation, on which frame is mounted an engine with its drive shaft extending downwardly, a spraying system including a pump mounted on the lower end of the drive shaft and driven thereby, the inlet of said pump adapted to be submerged beneath the surface of said body of water when said boat is floating thereon, a horizontal manifold above the water level of said boat at the stern of said boat connected with the outlet of said pump and pivotable about said vertical axis with said frame and engine, a plurality of spray means above said water level and extending rearwardly from said manifold, a tank adapted to contain a treating chemical on said boat, water-conveying means communicating said tank and the outlet side of said pump, and additional water-conveying means for conveying water containing said chemical from said tank to the spraying system for ultimate discharge from said spray means, whereby the water streams discharged from said spray means may be employed as a propulsive force for driving said boat forwardly and also as the propulsive force for steering said boat by turning said frame, engine and manifold about said vertical axis.

2. A floating unit for spraying a body of water comprising a boat, an outboard motor mounted on the stern of said boat, said outboard motor including a frame mounted for pivotal movement about a vertical axis of rotation, on which frame is mounted an engine with its drive shaft extending downwardly, a pump mounted on the lower end of said drive shaft and driven thereby, the inlet of said pump adapted to be submerged beneath the surface of said body of water when said boat is floating thereon, a horizontal manifold above the water level of said unit at the stern of said boat connected with the outlet of said pump and pivotable with said frame and engine, a plurality of spray means above said water level and extending rearwardly from said manifold, a tank in said boat adapted to contain a treating chemical, a water-conveying tap line connected on the outlet side of said pump and to said tank, and additional water-conveying means connected to said tank and the inlet side of said pump whereby the water containing said chemical is injected into the water drawn into said pump, and whereby the water streams from said spray means may impart a propulsive force to said boat.

3. A floating unit as claimed in claim 2 wherein said pump outlet has a hose connected to and communicating therewith, and valve means for closing off flow through either of said manifold and said hose.

4. A process for spraying a body of water with a chemical solution which comprises pumping water from said body of water with a pump mounted on a mobile, floating unit floating in the area of the body of water to be treated, injecting a chemical into the pumped water, spraying through the air and onto the surface of the body of water the pumped water containing said chemical rearwardly from said floating unit in a plurality of horizontally-spaced, substantially parallel, rearwardly directed streams of sufficient force to propel said floating unit forwardly, and steering said unit through said area by changing the direction of said parallel streams toward a direction laterally rearward of said floating unit to impart a lateral thrust to the rearward portion of said floating unit and thereby cause it to change its course.

5. A process for spraying a shallow area of a body of water infested with algae which comprises pumping water from said body of water with a pump mounted on a mobile, floating unit floating said said shallow area, injecting an algicide into the pumped water, spraying the pumped water containing said algicide rearwardly from said floating unit in a plurality of horizontally-spaced, substantially parallel, rearwardly directed streams of sufficient force to propel said floating unit forwardly, and steering said unit through said area by changing the direction of said parallel streams toward a direction laterally rearward of said floating unit to impart a lateral thrust to the rearward portion of said floating unit and thereby cause it to change its course.

6. A process for spraying a shallow area of a body of water infested with aquatic weeds which comprises pumping water from said body of water with a pump mounted on a mobile, floating unit floating in said shallow area, injecting a chemical aquatic weed killer into the pumped water, spraying the pumped water containing said chemical aquatic weed killer rearwardly from said floating unit in a plurality of horizontally-spaced, substantially parallel, rearwardly directed streams of sufficient force to propel said floating unit forwardly, and steering said unit through said area by changing the direction of said parallel streams toward a direction laterally rearward of said floating unit to impart a lateral thrust to the rearward portion of said floating unit and thereby cause it to change its course.

References Cited in the file of this patent

UNITED STATES PATENTS

| | | |
|---|---|---|
| 851,376 | Renault | Apr. 23, 1907 |
| 1,886,369 | Bogart | Nov. 8, 1932 |
| 1,943,152 | Ubiss | Jan. 9, 1934 |
| 2,168,821 | Elliott | Aug. 8, 1939 |
| 2,330,164 | Wiedenhoefer | Sept. 21, 1943 |
| 2,393,293 | Corley | Jan. 22, 1946 |
| 2,528,354 | Flanagan | Oct. 31, 1950 |
| 2,590,677 | Broyhill | Mar. 25, 1952 |
| 2,667,141 | Lepkowski | Jan. 26, 1954 |
| 2,970,821 | Axt | Feb. 7, 1961 |
| 3,046,735 | Burgin | July 31, 1962 |
| 3,064,616 | Dowty | Nov. 20, 1962 |
| 3,082,732 | Stallman | Mar. 26, 1963 |
| 3,090,346 | Burgin | May 21, 1963 |

FOREIGN PATENTS

| | | |
|---|---|---|
| 442,133 | Italy | Nov. 17, 1948 |
| 650,963 | Germany | Oct. 5, 1937 |
| 6,608 | Great Britain | Mar. 27, 1899 |

UNITED STATES PATENT OFFICE
CERTIFICATE OF CORRECTION

Patent No. 3,139,060                                June 30, 1964

Willis H. Dane

It is hereby certified that error appears in the above numbered patent requiring correction and that the said Letters Patent should read as corrected below.

Column 2, line 17, after "enough" insert -- and light enough --; column 6, line 27, for "said", first occurrence, read -- in --.

Signed and sealed this 17th day of November 1964.

(SEAL)
Attest:

ERNEST W. SWIDER
Attesting Officer

EDWARD J. BRENNER
Commissioner of Patents